United States Patent [19]

Toner

[11] 4,230,757
[45] Oct. 28, 1980

[54] SONICALLY SECURING ARTICLES IN PLASTIC MOUNTS

[75] Inventor: James K. Toner, Rochester, N.Y.

[73] Assignee: Eastman Kodak Company, Rochester, N.Y.

[21] Appl. No.: 917,623

[22] Filed: Jun. 21, 1978

[51] Int. Cl.² .......................... B32B 3/10; B32B 31/16
[52] U.S. Cl. .................................. 428/137; 156/73.1; 156/293; 156/580.1; 264/23; 422/56; 428/138; 428/167; 428/185
[58] Field of Search ................... 156/73.1, 73.4, 580.1, 156/293; 228/1 R, 110; 264/23; 428/167, 185, 137, 138

[56] References Cited

U.S. PATENT DOCUMENTS

| | | | |
|---|---|---|---|
| 3,661,661 | 5/1972 | Berleyoung | 156/580.1 |
| 3,819,437 | 6/1974 | Paine | 156/73.4 |
| 3,874,963 | 4/1975 | Barger | 156/73.2 |
| 3,973,064 | 8/1976 | Paine | 156/73.4 X |
| 3,992,158 | 11/1976 | Przybylowicz et al. | 422/58 X |
| 4,060,438 | 11/1977 | Johnson | 156/73.1 |
| 4,152,390 | 5/1979 | Nosco et al. | 422/63 |

*Primary Examiner*—John T. Goolkasian
*Assistant Examiner*—Robert A. Dawson
*Attorney, Agent, or Firm*—M. S. Sales

[57] ABSTRACT

An article and its method of manufacture is disclosed wherein three sheets of thermoplastic web material are bonded to form a laminated unit with an object captured therein. Energy director element sets are disposed between adjacent sheets in an orientation such that when the layers are brought together with the object therebetween and a compressive force and high frequency vibratory energy are applied to the unit, the pressure and vibratory energy are concentrated at a first portion of the energy director elements so that the thermoplastic material in the region of the concentrated pressure softens. A second portion of the energy director elements is aligned with, but spaced from the object to be captured between the sheets. The spacing corresponds generally with the thickness of the energy director elements so that, as the first portion of the energy director elements melts during sonic bonding, the second portion of the elements approaches the object. As bonding is completed, the second portion of the energy director elements contacts the object to securely hold it between the bonded sheets.

11 Claims, 7 Drawing Figures

SONICALLY SECURING ARTICLES IN PLASTIC MOUNTS

BACKGROUND OF THE INVENTION

Cross Reference to Related Applications

Reference is made to commonly assigned, copending U.S. patent applications Ser. No. 751,912 entitled CHEMICAL ANALYZER, filed in the names of Louis C. Nosco, Anthony P. DiFulvio and Henry S. Adamski on Dec. 17, 1976 (now abandoned), refiled as continuation-in-part application Ser. No. 856,834, filed Dec. 2, 1977, now U.S. Pat. No. 4,152,390 and Ser. No. 910,397 entitled HIGH FREQUENCY BONDING WITH CONCENTRATORS, filed in the name of E. C. Yen on May 30, 1978 which issued on Oct. 2, 1979 as U.S. Pat. No. 4,169,751.

Field of the Invention

The present invention relates generally to securing objects in laminated mounts of thermoplastic material, and more specifically to using sonic means to both bond the mount laminae together and capture the object. Objects mounted in accordance with the present invention are particularly useful in devices for determining the concentration of a component body fluid.

Description of the Prior Art

In recent years, a number of automated systems have been developed for carrying out quantitative chemical analysis of fluid samples. Many of the commercially available systems utilize liquid reagents, and require analyzer equipment having intricate solution handling and transport capabilities. However, at least one known fluid analyzing apparatus is adapted to transport discrete test elements containing dry reagents upon which chemical analysis tests are conducted. The test elements are metered through the apparatus and receive a drop of biological fluid to be tested. Apparatus of this type is described in commonly assigned, co-pending U.S. patent application Ser. No. 751,912, entitled CHEMICAL ANALYZER filed on Dec. 17, 1976 (now abandoned), refiled as continuation-in-part Ser. No. 856,834, filed Dec. 2, 1977, now U.S. Pat. No. 4,152,390 while the test elements may be of the type disclosed in co-assigned U.S. Pat. No. 3,992,158, which issued on Nov. 16, 1976.

To facilitate handling, a plastic mount is provided to support and carry each test element. The mounts are preferably formed of three sheets of thermoplastic material bonded together to form a laminated, integral mount with the test element captured therein. An example of such mounts and a method for bonding the thermoplastic sheets is described in commonly assigned, copending U.S. patent application Ser. No. 910,397 entitled HIGH FREQUENCY BONDING WITH CONCENTRATORS, filed in the name of E. C. Yen on May 30, 1978 which issued on Oct. 2, 1979 as U.S. Pat. No. 4,169,751.

The above-referenced application discloses a procedure wherein three sheets of thermoplastic material are stacked for sonic bonding. Apertures in the sheets receive a test element to be mounted, and energy director elements are positioned between the sheets. The stacked members are subjected to compressive force and high frequency vibratory energy which is concentrated by the energy director elements, melting the thermoplastic material at the sheet surfaces. The melted material flows together to form a strong molecular bond when subsequently cooled. The use of vibratory energy (sound waves of sub-sonic or ultrasonic frequency) to weld thermoplastic materials is commonly known as sonic bonding.

In order to capture and securely hold a test element in the laminated mount disclosed in the above-referenced application, a plurality of tabs are formed in one of the three sheets. During the sonic bonding operation, the tabs are bent down over the test element. By the present invention, I have provided a more convenient and more reliable procedure for capturing objects such as a test element in its mount. Although described with respect to mounts for biological fluid test elements, it will be understood that the present invention is equally suitable to other products. For instance, the procedure described herein may be well suited for capturing photographic transparencies in projection slide mounts.

SUMMARY OF THE INVENTION

In accordance with the present invention, an improved method and article of manufacture are provided in which an object is secured in a mount between sonically bonded thermoplastic layers of the mount. Energy director elements on at least one of the layers are arranged such that when the layers are stacked with the object therebetween and compressive force is applied to the layers, the greatest pressure is concentrated at a first portion of the energy director elements. Vibratory energy applied to the stack tends to soften the thermoplastic material first at the regions of the first portion of the energy director elements. A second portion of the energy director elements is aligned with but spaced from the object between the mount layers. The spacing corresponds generally with the thickness of the energy director elements so that, as the first portion of the energy director elements melts during sonic bonding, the spacing is closed and the second portion of the energy director elements approaches the object. As bonding is completed, the second portion of the energy director elements contacts the object to securely hold it between the laminated mount layers.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
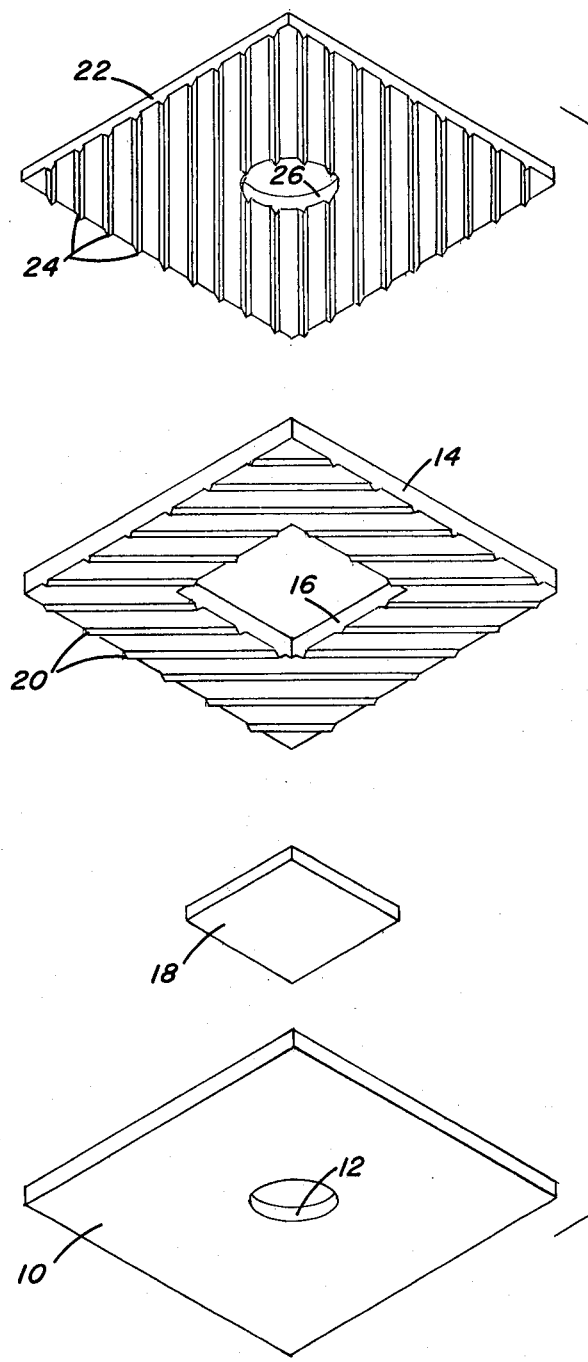
FIG. 1 is an exploded bottom perspective view of a mount and a test element in accordance with the present invention.

FIG. 1 is an exploded view of a test mount and a test element suitable for use with chemical analysis equipment as described in aforementioned U.S. Pat. No. 3,992,158. The bottommost layer shown in the figure is a sheet 10 of thermoplastic web material such as polystyrene. Polypropylene or polyimide may be used in some applications depending upon the intended use and desired characteristics. An aperture 12 extends through sheet 10 to permit a drop of test fluid to pass therethrough. Both upper and lower surfaces of sheet 10 are preferably flat.

Figure 2:
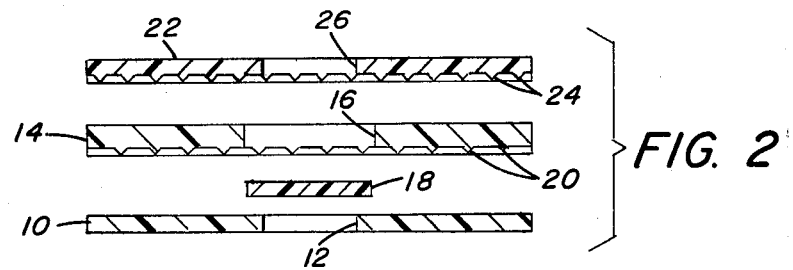
FIG. 2 is an elevational exploded view of the mount and test element shown in FIG. 1.

Above sheet 10 in FIG. 1, a second sheet 14 of similar material is provided with an aperture 16 shaped to receive an analytical test element 18 of the type hereinbefore described. As can be seen in FIG. 2, sheet 14 is thicker than test element 18.

A plurality of energy director elements comprising linear ribs 20 extend from the surface of sheet 14 which faces sheet 10. The ribs are shown as having a generally triangular cross sectional shape, and may be formed on the sheet during extrusion. When sheets 10 and 14 are brought together, contact is made only between ribs 20 and the flat surface of sheet 10. The ribs are shown as being parallel to each other and as extending diagonally across sheet 14. Conventional flash traps, not shown, may be provided adjacent to the energy director elements to receive excess material when the elements melt.

Figure 3:
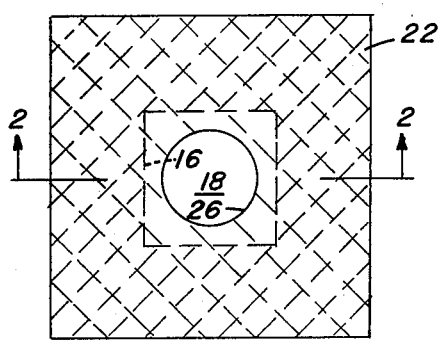
FIG. 3 is a top plan view of the mount and test element shown in FIGS. 1 and 2.

Above sheet 14 in FIGS. 1 and 2, is a third sheet 22 also formed of a thermoplastic material. A set of energy director elements 24 on the surface of sheet 22 faces sheet 14. Elements 24 are similar to elements 20 of sheet 14 but are disposed at an angle to elements 20. As used herein, the phrase "at an angle to" is intended to mean non-parallel to, such that when viewed from above, elements 24 cross elements 20. This arrangement is shown in FIG. 3, wherein each broken line is intended to represent one of the ribs. The purpose for crossing the energy director elements is fully explained in the hereinbefore identified Yen application.

Figure 4:
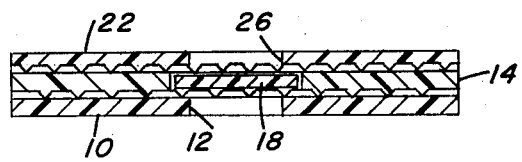
FIG. 4 is an elevational sectioned view of the mount and test element shown in FIG. 1 assembled prepatory to sonic bonding.

An aperture 26 extends through sheet 22 and is smaller than test element 18 so that sheet 22 partially covers the test element when the mount is assembled as shown in FIG. 4. It will be noted that a first portion of energy director elements 24 contact sheet 14 about aperture 16 when the mount is assembled and that a second portion of energy director elements overlie test element 18. In accordance with the present invention, energy director elements 24 project from the surface of sheet 22 by a distance substantially equal to the difference between the thickness of test element 18 and the thickness of sheet 14.

Figure 5:
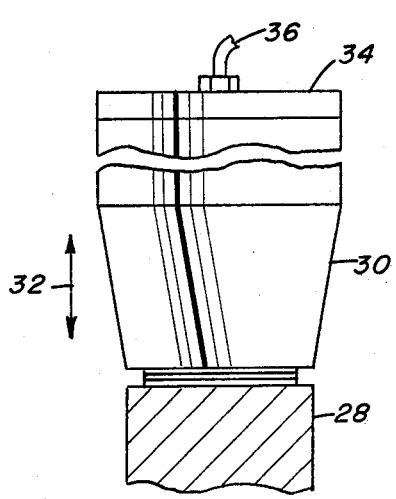
FIG. 5 is a side view of the mount of the preceding figures clamped between a sonic horn and anvil.

Once fully assembled in stacked relationship as shown in FIG. 4, the mount and test element are placed on an anvil 28 (FIG. 5) below a sonic horn 30 adapted for reciprocating movement toward and away from anvil 28 as indicated by an arrow 32. Horn 30 is coupled to a press, of conventional design such as shown in U.S. Pat. No. 3,661,661, for producing between horn 30 and anvil 28, a compressive force holding the assembled test element and mount therebetween. The sonic horn is driven by an electromechanical transducer 34, which produces high frequency vibrations in response to electrical signals via a conductor 36.

Figure 6:
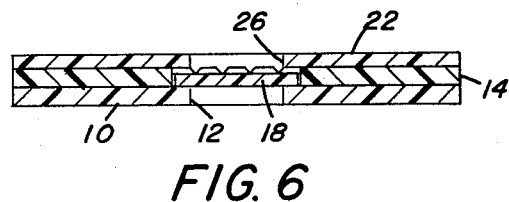
FIG. 6 is an elevational sectioned view of a completed mount and test element after sonic bonding and FIG. 7 is a view similar to FIG. 6 of another embodiment of the present invention.

When horn 30 is brought into engagement with the assembled mount and test element, the force of the press and the high frequency vibrations is transmitted between sheets 22 and 14 through a portion of energy director elements 24 and between sheets 14 and 10 through energy director elements 20. This condition causes rapid melting and flowing of that portion of the energy director elements which contact an underlying sheet (i.e., all of elements 20 and the outer first portion of elements 24). However, a second portion of energy director elements 22 which is aligned with aperture 16 of sheet 14 is under no compressive force and does not melt. As the first portion of elements 24 continue to melt, the tips of the second portion of those elements close upon test element 18 until they just touch the test element, as shown in FIG. 6, to thereby capture the test element. Simultaneously the electrical signals to transducer 34 are terminated to stop the vibratory energy passing through the test mount. Upon terminating the vibratory energy, a brief dwell period is provided during which the compressive force is maintained between the sheets. As the thermoplastic material cools, a bond forms, fusing the sheets together with test element 18 securely held therein.

Figure 7:
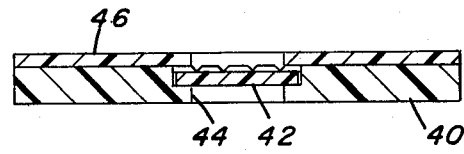

In the above-described, preferred embodiment, the mount is shown as being laminated of three layers 10, 14 and 22. However, the present invention provides similar benefits when the mount is formed of any number of two or more layers. For example, FIG. 7 shows a mount wherein the bottom layer 40 is recessed to receive a test element 42. An aperture 44 extends from the recessed surface to the bottom surface of layer 40. Top layer 46 is identical in structure and function to layer 22 of the embodiment shown in FIGS. 1-6.

Although the invention has been described with particular reference to a preferred embodiment thereof, it will be readily understood that variations and modifications can be effected within the spirit and scope of the invention as described hereinabove and as defined in the appended claims. For example, while energy director elements 20 and 24 have been described as being integral with sheets 14 and 22 and are shown in the drawings as being straight, it will occur to those skilled in the art that the director elements may be curved, may be on the other surfaces of the sheets than as shown in the drawings, may be of other than triagonal cross sectional shape, need not be integral with the sheets and need not be of a thermoplastic material.

What is claimed is:

1. A method for securing an object having a predetermined thickness in a laminated mount, said method comprising the steps of:

placing the object in a recess of a first thermoplastic sheet, said recess having a depth greater than the object thickness;

covering the first sheet with a second thermoplastic sheet having a plurality of energy director elements projecting from one surface by a distance substantially equal to the difference between the object thickness and the recess depth such that (1) a first portion of the energy director elements engage the surface of the first sheet about the recess and (2) a second portion of the energy director elements are aligned with the recess and the object therein; and applying compressive force and high frequency vibratory energy to the sheets, whereby thermoplastic material in the region of the first portion of the energy director elements melts and the second portion of the energy director elements moves into engagement with the object.

2. The method as defined by claim 1 wherein said compressive force and said vibratory energy are applied for respective time periods which are at least partially co-extensive.

3. The method as defined by claim 1 wherein:
said compressive force and said vibratory energy are applied for respective time periods which are at least partially co-extensive; and
said time period for application of said vibratory energy ends before the end of said time period for application of said compressive force.

4. A method for securing an object having a predetermined thickness in a laminated mount, said method comprising the steps of:
positioning a first thermoplastic sheet having (1) a thickness greater than the object thickness and (2) an aperture therethrough between two other sheets in stacked relationship;
placing the object into the aperture in said first sheet;
positioning a set of energy director elements between said first sheet and one of the other sheets, said energy director elements each having (1) a thickness substantially equal to the difference between the thickness of said first sheet and the thickness of the object (2) a first portion aligned with the aperture in said first sheet and (3) a second portion aligned with a region of said first sheet other than the aperture; and
applying compressive force and high frequency vibratory energy to the stacked sheets, whereby the thermoplastic material in the region of the second portion of the energy director elements is softened and melts; and the first portion of the energy director elements moves into engagement with the object in the aperture.

5. A method as defined in claim 4 further comprising the step of providing a second set of energy director elements between said first sheet and the second other sheet, whereby the thermoplastic material in the region of the second set of energy director elements is softened and melts during said force and energy applying step.

6. A method for securing an object having a predetermined thickness in a laminated mount formed of a first thermoplastic layer with an aperture therethrough, a second thermoplastic layer with an aperture therethrough and a third thermoplastic layer with an aperture therethrough larger than the apertures through the first and second layers and sized to receive the object, the third layer having a thickness greater than the object thickness; said method comprising the steps of:
positioning the first, second, and third layers in stacked relation with (1) the third layer between the first and second layers and (2) the three apertures generally aligned;
placing the object into the aperture of the third layer;
positioning a set of energy director elements between the first and third layers, said energy director elements having (1) a thickness substantially equal to the difference between the thickness of the third layer and the thickness of the object, (2) a first portion aligned with the aperture through the third layer and (3) a second portion aligned with a region of the third layer surrounding the aperture therethrough; and
applying compressive force and high frequency vibratory energy to the stacked layers, whereby the thermoplastic material in the region of the second portion of the energy director elements is softened and melts, and the first portion of the energy director elements moves into engagement with the object in the aperture.

7. An article of manufacture formed by:
positioning three thermoplastic sheets in stacked relationship with the center sheet (1) being a predetermined thickness and (2) having an aperture therethrough;
placing an object into the aperture, the object having a thickness less than said predetermined thickness;
positioning a set of energy director elements between the center sheet and one of the other sheets, said energy director elements having (1) a thickness substantially equal to the difference between the predetermined thickness and the thickness of the object, (2) a first portion aligned with the aperture and (3) a second portion aligned with a region of said center sheet other than the aperture;
applying compressive force and high frequency vibratory energy to the stacked sheets, whereby the thermoplastic material in the region of the second portion of the energy director elements is softened and melts, and the first portion of the energy director elements moves into engagement with the object in the aperture.

8. An article of manufacture formed as defined in claim 7 further comprising the step of positioning a second set of energy director elements between said center sheet and the other one of said other sheets, whereby the thermoplastic material in the region of the second set of energy director elements is softened and melts during application of compressive force and high frequency vibratory energy.

9. A method for securing an object having a predetermined thickness in a laminated mount, said method comprising the steps of:
placing the object in a recess of a first thermoplastic sheet, said recess having a depth greater than the object thickness;
covering the first sheet with a second thermoplastic sheet having a plurality of energy director elements projecting from one surface by a distance substantially equal to the difference between the object thickness and the recess depth such that (1) a first portion of the energy director elements engage the surface of the first sheet about the recess and (2) a second portion of the energy director elements are aligned with the recess and the object therein; and
applying compressive force and high frequency vibratory energy to the sheets, whereby thermoplastic material in the region of the first portion of the energy director elements melts and the second portion of the energy director elements moves toward the object.

10. A method for securing an object having a predetermined thickness in a laminated mount, said method comprising the steps of:
positioning a first thermoplastic sheet having (1) a thickness greater than the object thickness and (2) an aperture therethrough between two other sheets in stacked relationship;
placing the object into the aperture in said first sheet;
positioning a set of energy director elements between said first sheet and one of the other sheets, said energy director elements each having (1) a thickness substantially equal to the difference between the thickness of said first sheet and the thickness of the object, (2) a first portion aligned with the aperture in said first sheet and (3) a second portion aligned with a region of said first sheet other than the aperture; and applying compressive force and high frequency vibratory energy to the stacked sheets, whereby the thermoplastic material in the region of the second portion of the energy director elements is softened and melts; and the first portion of the energy director elements moves toward the object in the aperture.

11. An article of manufacture formed by:

placing an object in a recess of a first thermoplastic sheet, said recess having a depth greater than the object thickness;

covering the first sheet with a second thermoplastic sheet having a plurality of energy director elements projecting from one surface by a distance substantially equal to the difference between the object thickness and the recess depth such that (1) a first portion of the energy director elements engage the surface of the first sheet about the recess and (2) a second portion of the energy director elements are aligned with the recess and the object therein; and applying compressive force and high frequency vibratory energy to the sheets, whereby thermoplastic material in the region of the first portion of the energy director elements melts and the second portion of the energy director elements moves toward the object.

* * * * *